United States Patent
Fang et al.

(10) Patent No.: US 9,658,730 B2
(45) Date of Patent: *May 23, 2017

(54) 5-WIRE RESISTIVE TOUCH SCREEN PRESSURE MEASUREMENT CIRCUIT AND METHOD

(71) Applicant: TEXAS INSTRUMENTS INCORPORATED, Dallas, TX (US)

(72) Inventors: Wendy X. Fang, Murphy, TX (US); Ing-Yih James Wang, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,552

(22) Filed: Aug. 24, 2015

(65) Prior Publication Data

US 2015/0363028 A1 Dec. 17, 2015

Related U.S. Application Data

(63) Continuation of application No. 13/591,465, filed on Aug. 22, 2012, now Pat. No. 9,116,590, which is a
(Continued)

(51) Int. Cl.
*G06F 3/045* (2006.01)
*G06F 3/044* (2006.01)
*G06F 3/041* (2006.01)

(52) U.S. Cl.
CPC ............ *G06F 3/045* (2013.01); *G06F 3/044* (2013.01); *G06F 3/0414* (2013.01); *G06F 2203/04101* (2013.01); *G06F 2203/04112* (2013.01)

(58) Field of Classification Search
CPC .......... G06F 3/041; G06F 3/044; G06F 3/045; G06F 3/0414; G06F 2203/04112; G06F 2203/04101
(Continued)

(56) References Cited

U.S. PATENT DOCUMENTS

| 4,687,885 A | 8/1987 | Talmage, Jr. et al. |
| 6,246,394 B1 | 6/2001 | Kalthoff et al. |

(Continued)

FOREIGN PATENT DOCUMENTS

| EP | 0982677 | 3/2003 |
| JP | H0916071 | 6/1997 |

(Continued)

OTHER PUBLICATIONS

PCT Search Report, from PCT/US2010/060301 filed Dec. 14, 2010, mailed on Jul. 29, 2011.
(Continued)

*Primary Examiner* — Vijay Shankar
(74) *Attorney, Agent, or Firm* — Gregory J. Albin; Charles A. Brill; Frank D. Cimino (57) ABSTRACT

A 5-wire touch screen system includes a touch screen (10) including a wiper (11) and a resistive layer (16) aligned with the wiper and first (UL), second (UR), third (LR), and fourth (LL) resistive layer contacts, wherein a touch on the screen presses a small portion of the wiper against the resistive layer, producing a touch resistance ($R_Z$) between them at a touch point on the resistive layer. The wiper and various contacts are selectively coupled to first ($V_{DD}$) and second (GND) reference voltages, respectively, to generate an analog touch voltage ($V_Z$) at the touch point. The wiper and various contacts are selectively coupled to an analog input (56) and a reference voltage input of an ADC (48) for converting the touch voltage ($V_Z$) to a digital representation.

(Continued)

Analog voltages ($V_X$) and ($V_Y$) at the touch point are converted to corresponding digital representations by the ADC.

6 Claims, 9 Drawing Sheets

Related U.S. Application Data continuation of application No. 12/657,046, filed on Jan. 13, 2010, now Pat. No. 8,269,745.

(58) Field of Classification Search
USPC .................. 345/173–178; 178/18.01–18.09, 178/20.01–20.04
See application file for complete search history.

(56) References Cited

U.S. PATENT DOCUMENTS

| | | | |
|---|---|---|---|
| 6,459,424 B1 | 10/2002 | Resman | |
| 6,552,718 B2 | 4/2003 | Ahn et al. | |
| 7,215,330 B2 | 5/2007 | Rantet | |
| 8,269,745 B2* | 9/2012 | Fang et al. | 345/174 |
| 9,116,590 B2* | 8/2015 | Fang et al. | 345/174 |
| 2003/0080716 A1 | 5/2003 | Kao | |
| 2012/0218210 A1 | 8/2012 | DeCaro et al. | |

FOREIGN PATENT DOCUMENTS

| | | |
|---|---|---|
| JP | H11212712 | 8/1999 |
| JP | 2006277663 | 10/2006 |
| KR | 100378060 | 3/2003 |
| TW | 508562 | 11/2002 |
| WO | WO02069124 | 9/2002 |

OTHER PUBLICATIONS

Prosecution History of U.S. Appl. No. 13/591,465, filed Aug. 22, 2012 from Aug. 22, 2012 to Sep. 2, 2015 (342 pages).

Search Report, from Chinese Application No. 2010800654058 filed Dec. 14, 2010 (1 page).

* cited by examiner

5-WIRE RESISTIVE TOUCH SCREEN PRESSURE MEASUREMENT CIRCUIT AND METHOD

CROSS-REFERENCE TO RELATED APPLICATIONS

This application is a continuation of U.S. patent application Ser. No. 13/591,465, filed Aug. 22, 2012, which is a continuation of U.S. patent application Ser. No. 12/657,046, filed on Jan. 13, 2010 (U.S. Pat. No. 8,269,745) which are incorporated herein by reference for all purposes.

BACKGROUND OF THE INVENTION

The present invention relates generally to 5-wire touch screens, and more particularly to systems and methods for accurately determining touch pressure/force applied on 5-wire touch screens.

Figure 1:
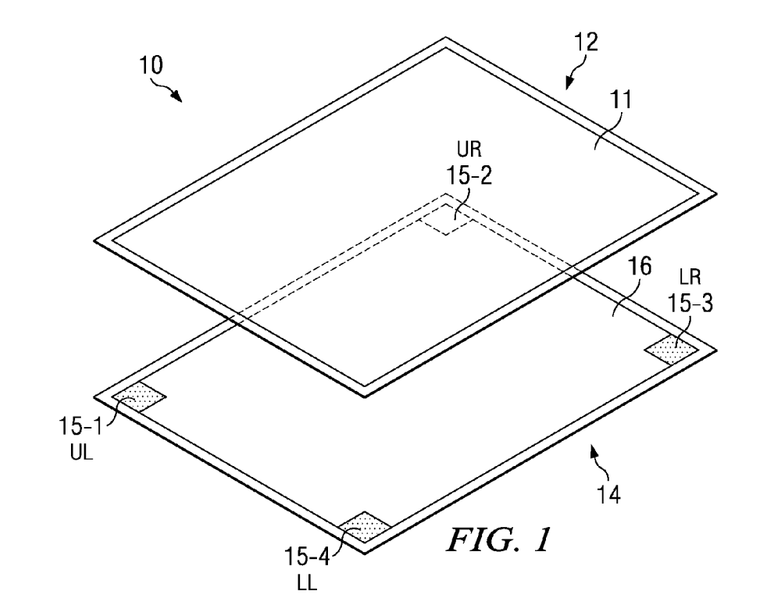
FIG. 1 is an exploded isometric diagram of a conventional 5-wire resistive touch screen.
Figure 2:
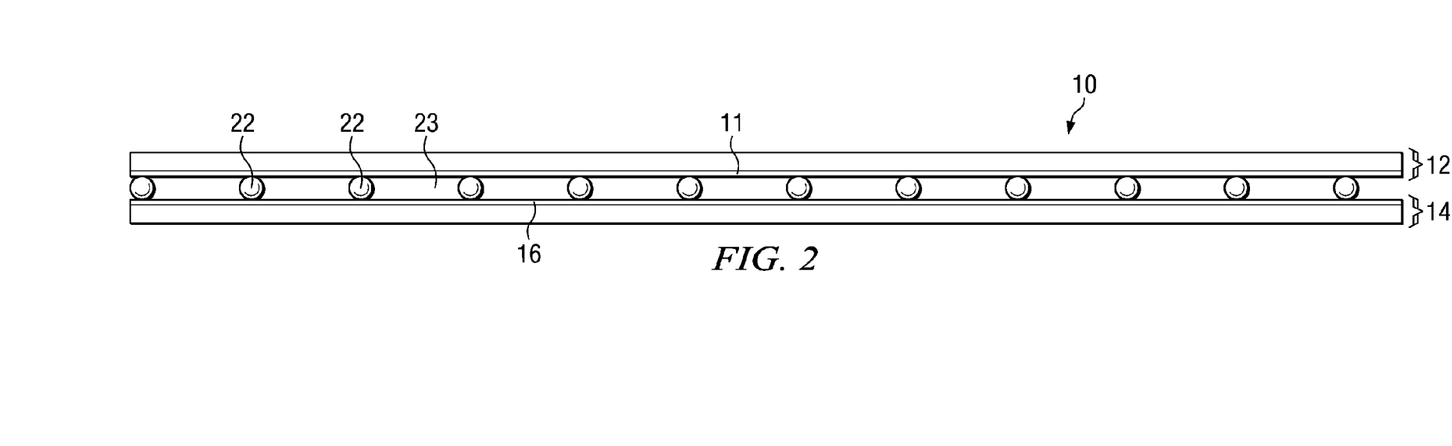
FIG. 2 is a section view of a conventional 5-wire resistive touch screen of FIG. 1.

FIG. 1 shows an exploded isometric diagram of a conventional 5-wire resistive touch screen 10 including a transparent bottom layer 14, coated with resistive film 16 and four conductive corner pads 15-1, 15-2, 15-3 and 15-4 that can be connected to an outside contact terminal, and a top layer 12. (The layers need to be transparent to allow display or LCD (liquid crystal display) backlighting to pass through.) FIG. 2 shows a section view of an implementation of the assembled version of the exploded view of touch screen 10 in FIG. 1, wherein top layer 12 typically is formed of polyester or polyethylene terephthalate (PET) and is coated underneath with highly conductive (e.g., metal) transparent material to form wiper layer 11 (also referred to simply as "wiper 11").

Transparent bottom layer 14 also is formed of PET, coated with transparent resistive film 16, which usually is ITO (indium tin oxide).

Elastic and insulative spacers 22 separate top layer 12 from bottom layer 14 so as to maintain a thin air gap 23 between them. Spacers 22 are typically very thin, and are used to avoid a large difference in the touch point contact resistance, which is dependent on where the touch is located relative to the locations of the spacers, and also to avoid substantial variation in the "feel" for various locations of the touch point relative to the spacers.

Applying a touch pressure to the outer surface of top layer 12 pushes a small touch contact area of wiper 11 against resistive ITO layer 16. When no touch pressure is present on top layer 12, it is separated from the bottom resistive layer 14 by spacers 22 and air gap 23.

The pressure of a touch on the upper surface of touch screen 10 typically is detected by a conventional 5-wire touch screen controller that controls various drive signals applied to the passive resistance of resistive layer 16 so as to facilitate measurement of various voltages resulting from touching various locations on the top surface of touch screen 10.

Figure 3:
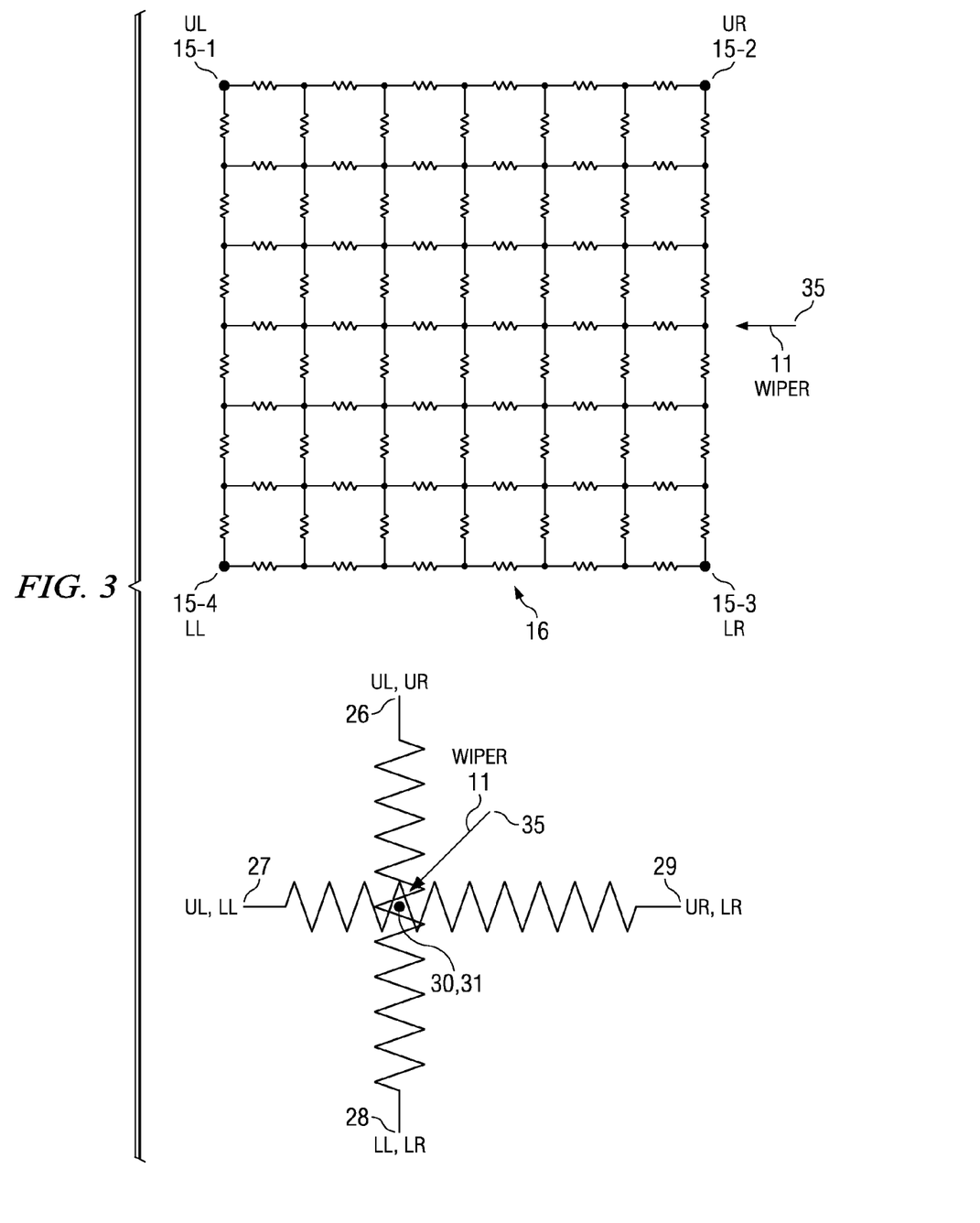
FIG. 3 is a diagram illustrating an equivalent circuit of a conventional 5-wire resistive touch screen as shown in FIGS. 1 and 2.

FIG. 3 shows an equivalent circuit of the idealized 5-wire resistive touch screen 10 depicted in FIGS. 1 and 2. Transparent resistive layer 16 of FIG. 2 is represented in FIG. 3 as a rectangular grid of equivalent resistors having conductive terminals UL, UR, LL, and LR on its upper left, upper right, lower left, and lower right corners corresponding to conductive pads 15-1, 15-2, 15-4, and 15-3, respectively, in FIG. 1. Wiper layer 11 thus is directly over resistive layer 16 and is connected to wiper contact terminal 35. Conductors or corner terminals 15-1, 15-2, 15-4, 15-3, and wiper contact terminal 35 are the 5 accessible conductors or "wires" of 5-wire touch screen 10. If corner terminals UL and LL are connected by a conductor 27 and terminals UR and LR are connected by a conductor 29 as indicated in the lower portion of FIG. 3, then resistive layer 16 appears as a resistor connected between conductors 27 and 29, as shown in the simplified equivalent circuit representation in the lower portion of FIG. 3. Similarly, if terminals UL and UR are connected together by conductor 26 and terminals LL and LR are connected together by conductor 28, resistive layer 16 appear as a resistor connected between conductors 26 and 28. A touch point area 31 on top conductive wiper 11 conducts touch pressure to a point or area 30 on the resistive grid when a touch is applied on touch screen 10.

Figure 4:
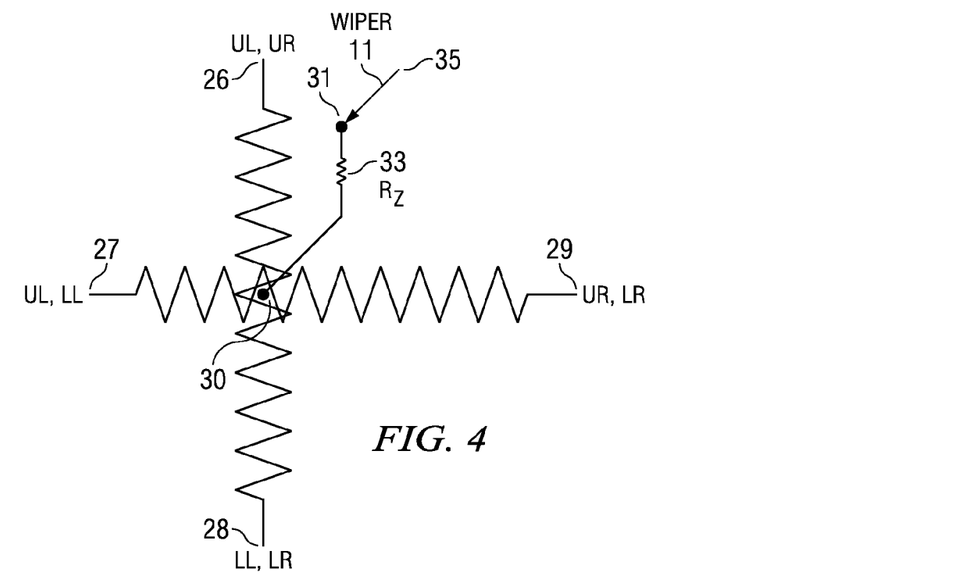
FIG. 4 is a diagram illustrating an equivalent circuit of a conventional 5-wire resistive touch screen as shown in FIGS. 1 and 2, where the touch point contact resistance Rz is displayed.

FIG. 4 shows an equivalent circuit similar to the equivalent circuit shown in FIG. 3 but further including the "touch resistance" 33 having a value $R_Z$ of a touch between contact area 31 on wiper 11 and contact area 30 on ITO resistive layer 16. Touch contact areas 30 and 31 are small contact areas that occur as a result of touch pressure applied on top layer 12 that presses small area 31 of wiper layer 11 against small area 30 of resistive layer 16. Note that wiper layer 11 is assumed to be of zero resistance in the equivalent circuit of FIG. 4.

Figure 5:
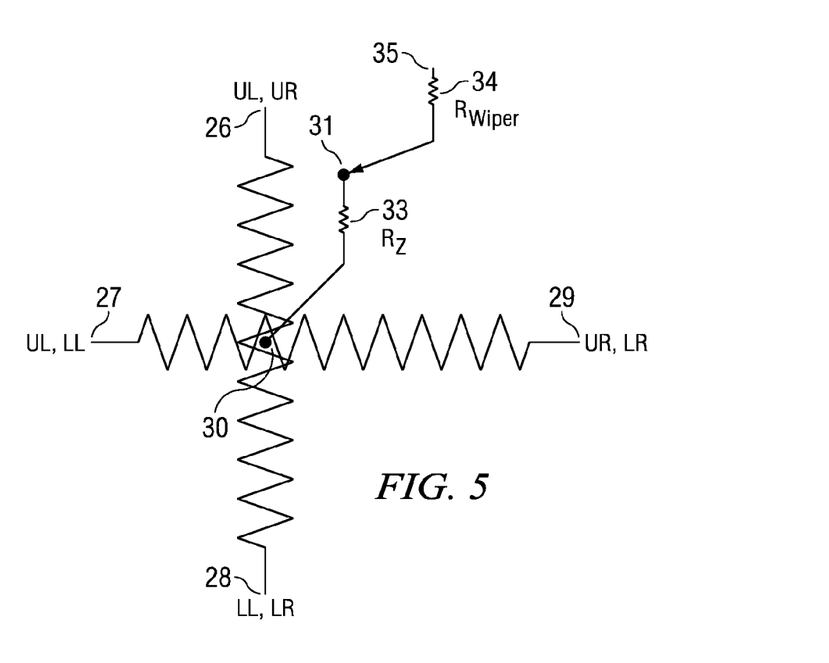
FIG. 5 is a diagram illustrating an equivalent of a conventional 5-wire resistive touch screen as shown in FIG. 4, wherein wiper resistance is indicated.

Unfortunately, it is not presently practical to provide a highly conductive (e.g., metal) contact wiper layer 11 that is sufficiently transparent for the LCD backlighting applications in which touch screens often are utilized. The wiper layer coat 11 on the lower surface of top layer 12 is presently composed of nearly-transparent ITO resistive material, the same as resistive layer 16 on the upper surface of bottom layer 14. As the result, the equivalent circuit of a practical S-wire touch screen 10 may be as shown in FIG. 5, where resistance 34 having a value $R_{wiper}$ represents the resistance of ITO resistive wiper layer 11 between the touch area 31 and wiper contact terminal 35.

Typically, each of the two ITO resistive layers 11 and 16 is approximately 90% transparent. Therefore, the top and bottom layers 12 and 14 together are 90%×90%=81% transparent, theoretically. This is very important, because lower transparency of the touch screen causes more power to be dissipated in the LCD backlighting circuitry in order to provide sufficient light intensity.

Figure 6A:
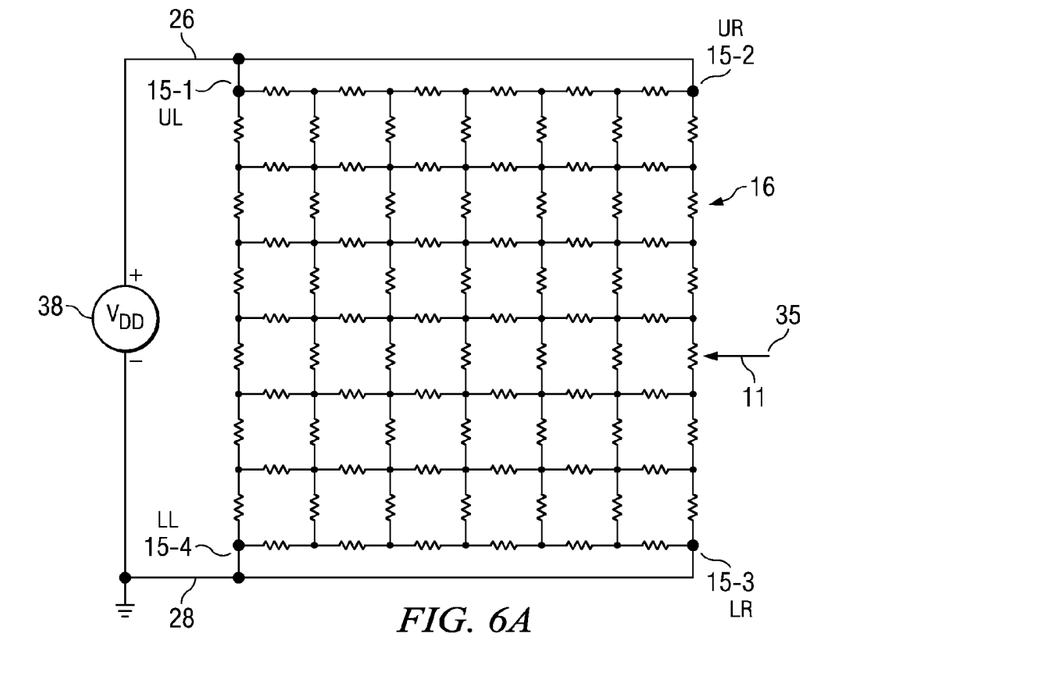
FIG. 6A is a diagram of an equivalent circuit useful in explaining in the measurement of the y-coordinate of a touch for the conventional 5-wire resistive touch screens depicted in FIGS. 1-5.
Figure 6B:
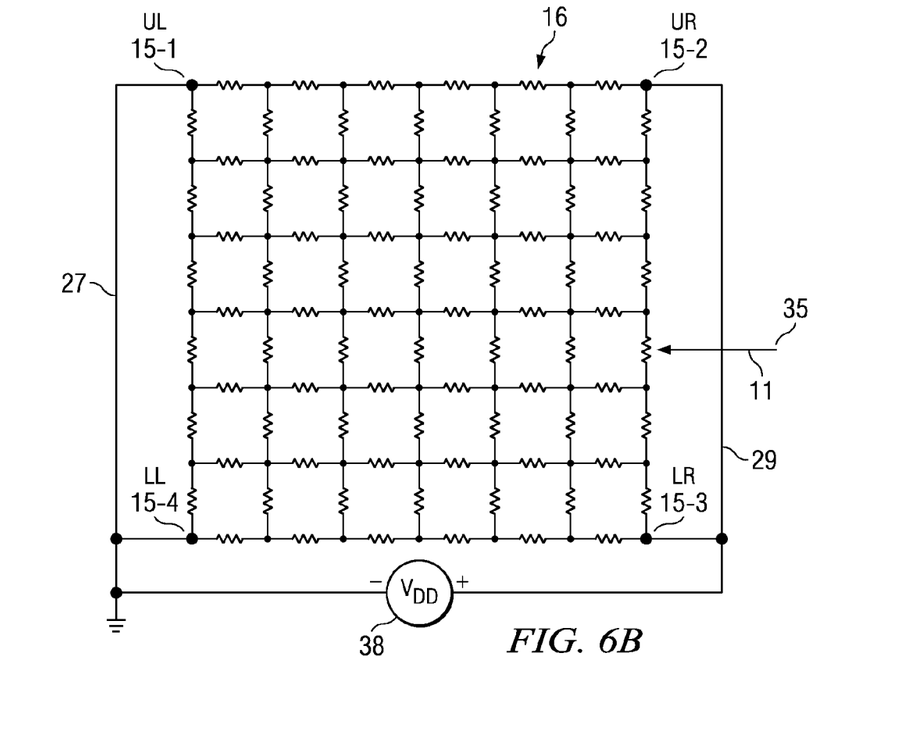
FIG. 6B is a diagram of an equivalent circuit useful in explaining the measurement of the x-coordinate of a touch for the conventional 5-wire resistive touch screens depicted in FIGS. 1-5.

FIG. 6A is an equivalent circuit that is useful in explaining the process of determining the y-coordinate of a touch on a conventional 5-wire resistive touch screen. Measurement of the y-coordinate includes applying a voltage $V_{DD}$ of voltage source 38 between conductor 26, which is connected to terminals UL (15-1) and UR (15-2), and conductor 28, which is connected to terminals LL (15-4) and LR (15-3). Sensing the y-coordinate location of the electrical contact at the touch point (not shown) is accomplished through conductive terminal 35 of wiper 11. Similarly, FIG. 6B is an equivalent circuit useful in explaining the process of determining the x-coordinate of a touch on the touch screen. Measurement of the x-coordinate includes applying a voltage $V_{DD}$ between conductor 29, which is connected to terminals LR and UR, and conductor 27, which is connected to terminals UL and LL. Sensing the location of the electrical contact at the touch point is accomplished through conductive point 35 of wiper 11.

Figure 7A:
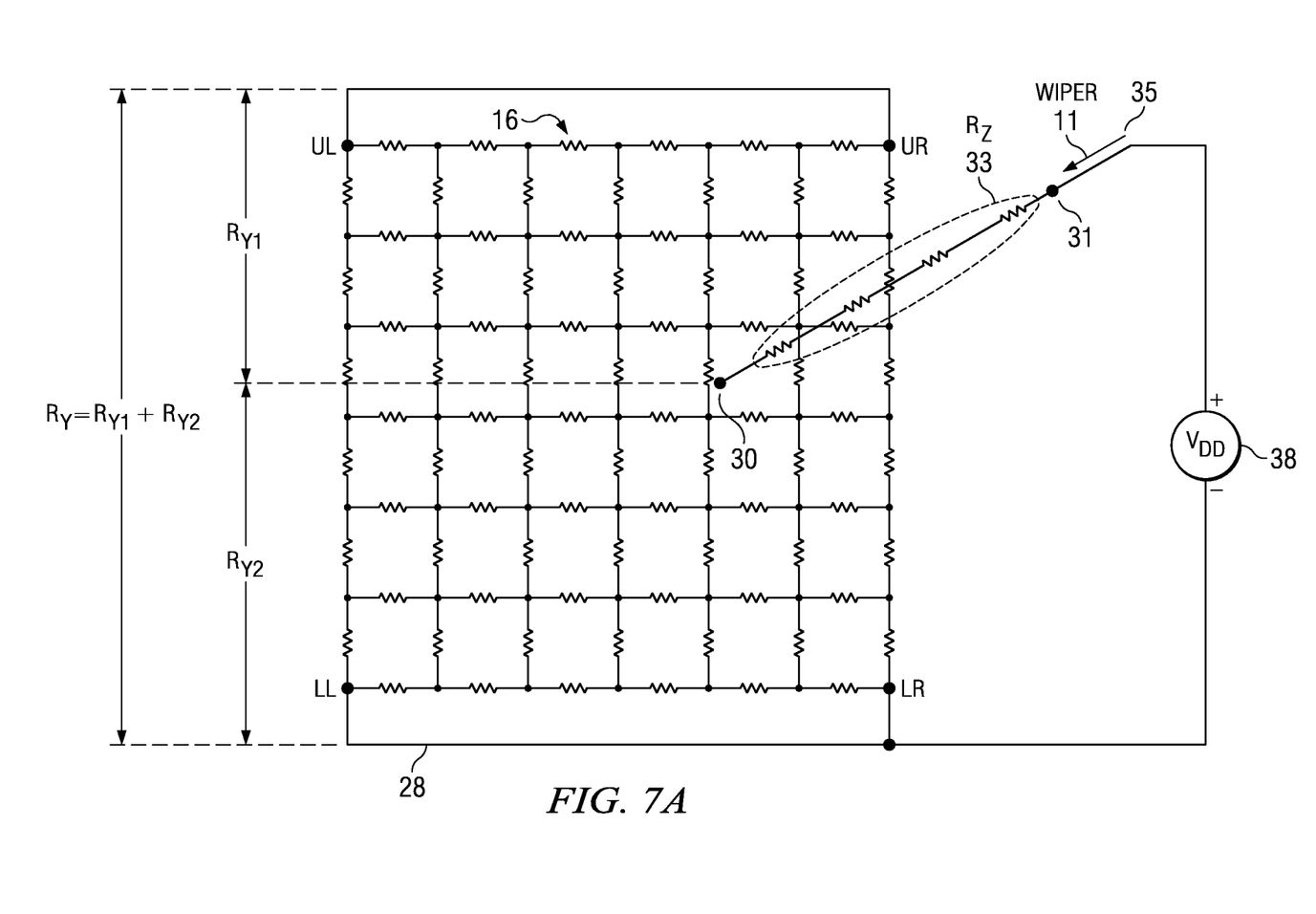
FIG. 7A is a diagram of an equivalent circuit, in which the wiper resistance is assumed to be zero that is useful in explaining the measurement of a z-coordinate representative of touch pressure applied to the touch point of the idealized 5-wire resistive touch screens depicted in FIGS. 1-4 as a function of y-coordinate parameters.

More specifically, the above-mentioned touch screen controller to which touch screen 10 is coupled first applies the screen driving voltage $V_{DD}$ of voltage source 38 between conductors 26 and 28, causing current to flow uniformly across the screen from top to bottom in FIG. 6A. The y-coordinate voltage $V_Y$ is read from contact terminal 35 of wiper 11, and is given by the expression $$V_Y = \frac{V_{DD}}{R_Y} \times R_{Y2}, \qquad \text{Eq. 1}$$

where the y-direction resistance $R_Y$ between conductors 26 and 28 is a known value that can be easily measured. $R_{Y2}$ is the resistance between the touch point 30 and the negative (−) terminal of voltage source 38. ($R_Y$ and $R_{Y2}$ are illustrated in FIG. 7A.)

Figure 7B:
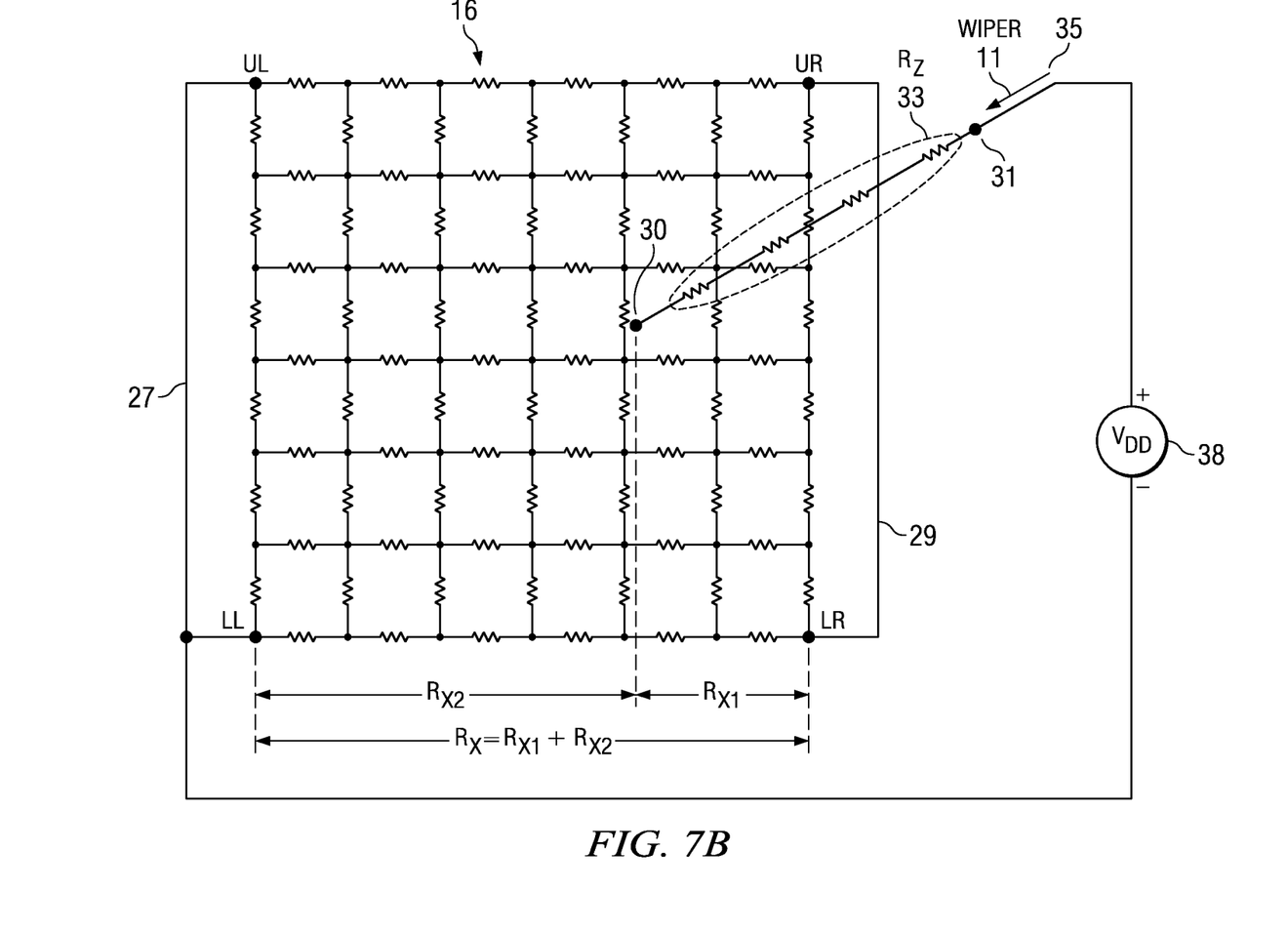
FIG. 7B is a diagram of an equivalent circuit, in which the wiper resistance is assumed to be zero, as in FIG. 4, that is useful in explaining the measurement of a z-coordinate representative of touch pressure applied to the touch point of the ideal 5-wire resistive touch screens depicted in FIGS. 1-4, as a function of x-coordinate parameters.

Similarly, the touch screen controller applies the screen driving voltage $V_{DD}$ of voltage source 38 between conductors 29 and 27 in FIG. 6B, causing current to flow uniformly across the screen from right to left. The x-coordinate voltage $V_X$ is read from contact terminal 35 of wiper 11, and is given by the expression $$V_X = \frac{V_{DD}}{R_X} \times R_{X2}, \qquad \text{Eq. 2}$$

where the x-direction resistance $R_X$ between conductors 27 and 29 is a known value that can be easily measured. $R_{X2}$ is the resistance between the touch point 30 and the negative (−) terminal of voltage source 38. ($R_X$ and $R_{Y2}$ are illustrated in FIG. 7B.)

In addition to the foregoing touch screens, the closest prior art is believed to also include U.S. Pat. Nos. 6,246,394 and 7,215,330. U.S. Pat. No. 6,246,394 "Touch screen Measurement Circuit and Method", issued Jun. 12, 2001 to Kalthoff et al., discloses a 4-wire touch screen digitizing system, and presents a method that measures the x and y coordinates of a touch location. U.S. Pat. No. 7,215,330 "Touch-Sensitive Surface Which Is Also Sensitive to Pressure Levels", issued May 8, 2007 to Rantet, discloses a 4-wire touch screen that includes orthogonal conductive tracks 6 and 8 connected to resistive strips along edges of the two screens that make up the touch-sensitive screen, such that the x and y coordinates and the applied pressure can be measured. The method measures the pressure or third or "z" coordinate of a touch point on a 4-wire resistive touch screen.

Touch screen users may occasionally bump a nearby article that imparts mechanical vibration to a touch screen that can cause the associated touch screen system to erroneously interpret touch location or erroneously interpret the vibration as an intentional touch. Also, users may inadvertently touch the screen surface. If the touch screen and associated controller have the capability of measuring the touch resistance between the wiper layer and the resistive layer of the touch screen, then a "sensitivity" threshold value can be established which prevents erroneous touch interpretation due to mechanical vibration or light extraneous touches on the touch screen surface. In some applications, for example, interpreting Chinese characters being written on a touch screen or drawing of graphical features, varying amounts of force/pressure applied to the touch screen surface by a stylus can be interpreted as representing lines of varying width or darkness. Also, there are applications in which the above-mentioned sensitivity threshold value can be utilized to prevent electrical noise, such as EMI (electromagnetic interference), from causing touch interpretation errors.

The prior 5-wire touch screen systems can only measure x- and y-coordinates, lack any method for obtaining third-coordinate or pressure data, and have limited capability for performing certain functions, such as signature verification, in which the pressure applied to provide a valid signature can be very significant. Without the pressure measurement of the present invention for a 5-wire touch screen system, the 5-wire touch screen system can generate only 2-dimensional coordinates, and therefore supports only 2-dimensional applications on the touch screen surface.

Thus, there is an unmet need for a system that measures 3 touch point coordinate voltages developed in a touch screen panel to represent x coordinates, y coordinates, and a touch point contact resistance coordinate, respectively, between a wiper layer and a resistive layer of a 5-wire touch screen.

There also is an unmet need for a system that measures 3 touch point coordinate voltages developed in a touch screen panel to represent x coordinates, y coordinates, and a touch point contact resistance coordinate between a wiper layer and a resistive layer of a 5-wire touch screen, wherein the touch point contact resistance is utilized to determine a touch point contact pressure or force.

There also is an unmet need for a touch screen system capable of providing improved signature verification by utilizing the touch pressure contact resistance in a 5-wire touch screen.

There also is an unmet need for a touch screen system capable of providing touch intensity measurements by utilizing the touch point contact resistance on a 5-wire touch screen.

There also is an unmet need for a touch screen system capable of providing touch sensitivity measurements by utilizing the touch point contact resistance on a 5-wire touch screen, wherein EMI (electro-magnetic interference) from the touch screen can be distinguished from real touches or pressures.

There also is an unmet need for a touch screen system capable of providing touch sensitivity measurements by utilizing the touch point contact resistance in a 5-wire touch screen. wherein touch point size information can be determined.

SUMMARY OF THE INVENTION

It is an object of the invention to provide a system that measures 3 touch point coordinate voltages developed in a 5-wire touch screen panel to represent x coordinates, y coordinates, and a touch point contact resistance coordinate, respectively, between a wiper layer and a resistive layer.

It is another object of the invention to provide a system that measures 3 touch point coordinate voltages developed in a 5-wire touch screen panel to represent x coordinates, y coordinates, and a touch point contact resistance, respectively, between a wiper layer and a resistive layer, wherein the touch point contact resistance is utilized to determine a touch point contact pressure or force.

It is another object of the invention to provide a touch screen system capable of providing improved signature verification by utilizing touch point contact resistance in a 5-wire touch screen.

It is another object of the invention to provide touch sensitivity measurements by utilizing touch point contact resistance in a 5-wire touch screen.

It is another object of the invention to provide touch sensitivity measurements by utilizing touch point contact resistance in a 5-wire touch screen, wherein EMI (electro-magnetic interference) from the touch screen can be distinguished from real touches or pressures.

It is another object of the invention to provide touch sensitivity measurement by utilizing touch point contact resistance in a 5-wire touch screen, wherein touch point size can be determined.

Briefly described, and in accordance with one embodiment, the present invention provides a 5-wire touch screen system that includes a touch screen (10) including a wiper (11) and a resistive layer (16) aligned with the wiper and first (UL), second (UR), third (LR), and fourth (LL) resistive layer contacts, wherein a touch on the screen presses a small portion of the wiper against the resistive layer, producing a touch resistance ($R_Z$) between them at a touch point on the resistive layer. The wiper and various contacts are selectively coupled to first ($V_{DD}$) and second (GND) reference voltages, respectively, to generate an analog touch voltage ($V_Z$) at the touch point. The wiper and various contacts are selectively coupled to an analog input (56) and a reference voltage input of an ADC (48) for converting the touch voltage ($V_Z$) to a digital representation. Analog voltages ($V_X$) and ($V_Y$) at the touch point are converted to corresponding digital representations by the ADC.

In one embodiment, the invention provides a 5-wire touch screen system (40) including a 5-wire touch screen sensor (10), a substantially transparent, substantially conductive wiper layer (11), a substantially transparent resistive layer (16) aligned with the wiper layer (11) wherein the resistive layer (16) includes first (UL), second (UR), third (LL), and fourth (LR) contact terminals, and a plurality of thin spacers (22) separating the wiper layer (11) and the resistive layer (16), wherein a touch on the wiper layer (11) presses a small portion (31) of the wiper layer (11) against the resistive layer (16) to form a resistive contact area (30) having a touch resistance ($R_Z$) between the wiper layer (11) and the resistive layer (16), the touch resistance ($R_Z$) being inversely proportional to an intensity ($P_{touch}$) of the touch. A controller (41) coupled to the touch screen sensor (10) includes touch screen driver circuitry (42) for selectively coupling the wiper layer (11) and the various contact terminals (UL,UR,LR,LL) to first ($V_{DD}$) and second (GND) reference voltages, respectively, to generate first ($V_X$) and second ($V_Y$) analog touch location voltages and an analog touch voltage ($V_Z$) on the resistive layer (16) at the resistive contact area (30). Analog to digital conversion circuitry (48) has an input (56) coupled to the touch screen driver circuitry (42). Multiplexing circuitry (44) in the controller (41) selectively couples the wiper layer (11) and various contact terminals (UL,UR,LR,LL) to the input (56) of the analog to digital conversion circuitry (48) so as cause it to convert the first ($V_X$) and second ($V_Y$) analog touch location voltages and the analog touch voltage ($V_Z$) to digital representations (60) thereof, respectively.

In one embodiment, the first (UL), second (UR), third (LR), and fourth (LL) contact terminals are corner contact terminals. The touch screen driver circuitry (42) couples the second (UR) and third (LR) contact terminals to the first reference voltage ($V_{DD}$), the first (UL) and fourth (LL) contact terminals to the second reference voltage (GND), and the wiper layer (11) to the input (56) of the analog to digital conversion circuitry (48) so as to produce an analog x-coordinate voltage ($V_X$) on the input (56) of the analog to digital conversion circuitry (48). The touch screen driver circuitry (42) couples the first (UL) and second (UR) contact terminals to the first reference voltage ($V_{DD}$), the third (LR) and fourth (LL) contact terminals to the second reference voltage (GND), and the wiper layer (11) to the input (56) of the analog to digital conversion circuitry (48) to produce an analog y-coordinate voltage ($V_Y$) on the input (56) of the analog to digital conversion circuitry (48). The touch screen driver circuitry (42) couples the wiper layer (11) to the first reference voltage ($V_{DD}$), the third (LR) and fourth (LL) contact terminals to the second reference voltage (GND), and the first (UL) and second (UR) contact terminals to the input (56) of the analog to digital conversion circuitry (48) to produce the analog touch voltage ($V_Z$) as an analog z-coordinate voltage ($V_Z$) on the input (56) of the analog to digital conversion circuitry (48).

In a described embodiment, a digital output of the controller (41) is coupled by means of at least a digital bus (64) to a host processor (66), wherein the host processor (66) computes a value of the touch resistance ($R_Z$) which corresponds to the analog y-coordinate voltage ($V_Y$), the analog z-coordinate voltage ($V_Z$), and a predetermined value of a touch screen resistance ($R_Y$). The host processor (66) computes a value of the touch intensity ($P_{touch}$) from the value of the touch resistance ($R_Z$) based on a predetermined relationship between the touch resistance ($R_Z$) and the touch intensity ($P_{touch}$).

In a described embodiment, the analog to digital conversion circuitry (48) converts the analog x-coordinate voltage ($V_X$) to a digital x-coordinate location number representative of an x-coordinate of the resistive contact area (30). The analog to digital conversion circuitry (48) also converts the analog y-coordinate voltage ($V_Y$) to a digital y-coordinate location number representative of a y-coordinate of the resistive contact area (30). The analog to digital conversion circuitry (48) also converts the analog z-coordinate voltage ($V_Z$) to a z-coordinate location number representative of the touch resistance ($R_Z$) on the contact area (30).

In a described embodiment, the host processor (66) converts the digital x-coordinate location number to a digital x-coordinate voltage value ($V_X$) and converts the digital y-coordinate location number to a digital y-coordinate voltage value ($V_Y$). The host processor (66) converts the digital z-coordinate location number to a digital z-coordinate voltage value ($V_Z$) and also converts the digital z-coordinate voltage value ($V_Z$) to a digital value of the touch resistance ($R_Z$). The host processor (66) computes a value of the touch intensity ($P_{touch}$) based on the digital value of the touch resistance ($R_Z$).

In a described embodiment, the touch screen driver circuitry (42) includes first (Q1), second (Q2), third (Q3) and fourth (Q5) P-channel switching transistors having sources coupled to the first reference voltage ($V_{DD}$) and drains coupled to the wiper layer (11), the second contact terminal (UR), the third contact terminal (LR), and the first contact terminal (UL), respectively. Fifth (Q4) and sixth (Q6) N-channel switching transistors have sources coupled to the second reference voltage (GND) and drains coupled to the third contact terminal (LR) and the fourth contact terminal (LL), respectively. The gates of the first, second, third, fourth, fifth, and sixth switching transistors are coupled to a touch screen driver control circuit (68) for controlling operation of the touch screen driver circuitry (42) to measure the analog x-coordinate voltage ($V_X$), the analog y-coordinate voltage ($V_Y$), and the analog z-coordinate voltage ($V_Z$). In a described embodiment, a pre-processing circuit (50) is coupled between an output (60) of the analog to digital conversion circuitry (48) and the digital bus (64) to perform filtering of digital signals on the output (60) of the analog to digital conversion circuitry (48).

In one embodiment, the invention provides a method for operating a 5-wire touch screen system (40), including providing a 5-wire touch screen sensor (10) that includes a wiper layer (11) and a resistive layer (16) aligned with the wiper layer (11) and also includes first (UL), second (UR), third (LR), and fourth (LL) contact terminals, wherein a touch on the wiper layer (11) presses a small portion (31) of the wiper layer (11) against the resistive layer (16) thereby causing or substantially changing a touch resistance ($R_Z$) between a contact area (31) of the wiper layer (11) and a resistive contact area (30) of the resistive layer (16), the touch resistance ($R_Z$) being inversely proportional to an intensity ($P_{touch}$) of the touch; selectively coupling the wiper layer (11) and various contact terminals (UL,UR,LR,LL) to first ($V_{DD}$) and second (GND) reference voltages, respectively, to generate an analog touch voltage ($V_Z$) on the resistive layer (16) at the resistive contact area (30), the analog touch voltage ($V_Z$) being a function of the touch resistance ($R_Z$); and selectively coupling the wiper layer (11) and various contact terminals (UL,UR,LR,LL) to an input (56) of analog to digital conversion circuitry (48) and converting the analog touch voltage ($V_Z$) to a digital representation (60) thereof by means of the analog to digital conversion circuitry (48).

In one embodiment, the method includes coupling the first (UL) and second (UR) contact terminals to the first reference voltage ($V_{DD}$), coupling the fourth (LL) and third (LR) contact terminals to the second reference voltage (GND), and coupling the wiper layer (11) to the input (56) of the analog to digital conversion circuitry (48) to produce an analog y-coordinate voltage ($V_Y$) on the input (56) of the analog to digital conversion circuitry (48); coupling the second (UR) and third (LR) contact terminals to the first reference voltage ($V_{DD}$), coupling the first (UL) and fourth (LL) contact terminals to the second reference voltage (GND), and coupling the wiper layer (11) to the input (56) of the analog to digital conversion circuitry (48) to produce an analog x-coordinate voltage ($V_X$) on the input (56) of the analog to digital conversion circuitry (48); and coupling the third (LR) and fourth (LL) contact terminals to the second reference voltage (GND), coupling the wiper layer (11) to the first reference voltage ($V_{DD}$); and coupling the first (UL) and second (UR) contact terminals to the input (56) of the analog to digital conversion circuitry (48) to produce the analog touch voltage ($V_Z$) as an analog z-coordinate voltage ($V_Z$) on the input (56) of the analog to digital conversion circuitry (48).

In one embodiment, the method includes coupling an output (60) of the analog to digital conversion circuitry (48) by means of at least a digital bus (64) to a host processor (66), and operating the host processor (66) to compute a value of the touch resistance ($R_Z$) which corresponds to the analog y-coordinate voltage ($V_X$), the analog z-coordinate ($V_Z$), and a predetermined value of a touch screen resistance ($R_Y$).

In one embodiment, the method includes operating the analog to digital conversion circuitry (48) to convert the analog x-coordinate voltage ($V_X$) to a digital x-coordinate location number representative of an x-coordinate of the resistive contact area (30), to convert the analog y-coordinate voltage ($V_Y$) to a digital y-coordinate location number representative of a y-coordinate of the resistive contact area (30), and to convert the analog z-coordinate voltage ($V_Z$) to a digital y-coordinate location number representative of a z-coordinate of the resistive contact area (30), wherein the host processor (66) computes the value of the touch resistance ($R_Z$) on the basis of the z-coordinate location numbers. In one embodiment, the host processor (66) computes a value of the touch intensity ($P_{touch}$) from the value of the touch resistance ($R_Z$) based on a predetermined relationship between the touch resistance ($R_Z$) and the touch intensity ($P_{touch}$).

In one embodiment, the invention provides a 5-wire touch screen system (40) including a 5-wire touch screen sensor (10) that includes a wiper layer (11) and a resistive layer (16) aligned with the wiper layer (11) and includes first (UL), second (UR), third (LR), and fourth (LL) contact terminals, wherein a touch on the wiper layer (11) presses a small portion of the wiper layer (11) against the resistive layer (16) to produce a touch resistance ($R_Z$) between a contact area (31) of the wiper layer (11) and a resistive contact area (30) of the resistive layer (16), the touch resistance ($R_Z$) being inversely proportional to an intensity ($P_{touch}$) of the touch; means (42) for selectively coupling the wiper layer (11) and various contact terminals (UL,UR,LR,LL) to first ($V_{DD}$) and second (GND) reference voltages, respectively, to generate an analog touch voltage ($V_Z$) on the resistive layer (16) at the resistive contact area (30), the analog touch voltage ($V_Z$) being a function of the touch resistance ($R_Z$); and means (44) for selectively coupling the wiper layer (11) to various contact terminals (UL,UR,LR,LL) to an input (56) of analog to digital conversion means (48) for converting the analog touch voltage ($V_Z$) to a digital representation (60) thereof.

BRIEF DESCRIPTION OF THE DRAWINGS

FIG. 9 is a diagram of an equivalent circuit as in FIG. 8A that further includes the effects of wiper resistance as in FIG.

5 and is useful in explaining the measurement of a z-coordinate representative of touch pressure applied to the touch point of the conventional 5-wire resistive touch screens depicted in FIGS. 1-5.

DETAILED DESCRIPTION OF THE PREFERRED EMBODIMENTS

FIGS. 7A and 7B show an equivalent circuit of a touch screen 10 (FIG. 1) on which a touch pressure has been applied on a small area 31 of wiper layer 11, thereby pressing it against the surface of top layer 12 to thereby form a resistive touch pressure contact area 30 on resistive layer 16. Touch pressure contact areas 30 and 31 result in a contact resistance $R_Z$ (or a very substantial change in the contact resistance $R_Z$) between wiper 11 and resistive layer 16. Dashed line 33 surrounds the touch pressure contact area resistance $R_Z$ as diagrammatically illustrated in FIGS. 7A and 7B. Resistive layer 16 (also see FIG. 2) is represented as a rectangular grid of discrete resistors with terminals UL, UR, LL, and LR in its upper left, upper right, lower left, and lower right corners corresponding to conductive pads 15-1, 15-2, 15-4, and 15-3, respectively, as shown in the exploded view in prior Art FIG. 1.

Pressure contact area resistance $R_Z$ is connected in series between resistive layer 16 and wiper 11. The (+) terminal of a reference voltage source 38 produces a voltage $V_{DD}$ between the contact terminal 35 of wiper 11 and conductor 28 as shown in FIG. 7A or between the contact terminal 35 of wiper 11 and conductor 27 as shown in FIG. 7B. In this case, the wiper resistance ($R_{Wiper}$ in FIGS. 5 and 9) is assumed to be zero.

FIG. 7A shows that a resistance $R_Y$ of resistive layer 16 between conductors 26 and 28 is equal to the sum of $R_{Y1}$ and $R_{Y2}$, where $R_{Y1}$ is the resistance in resistive layer 16 between conductor 26 and touch pressure contact area 30 and $R_{Y2}$ is the resistance between touch pressure contact area 30 and conductor 28.

Figure 8A:
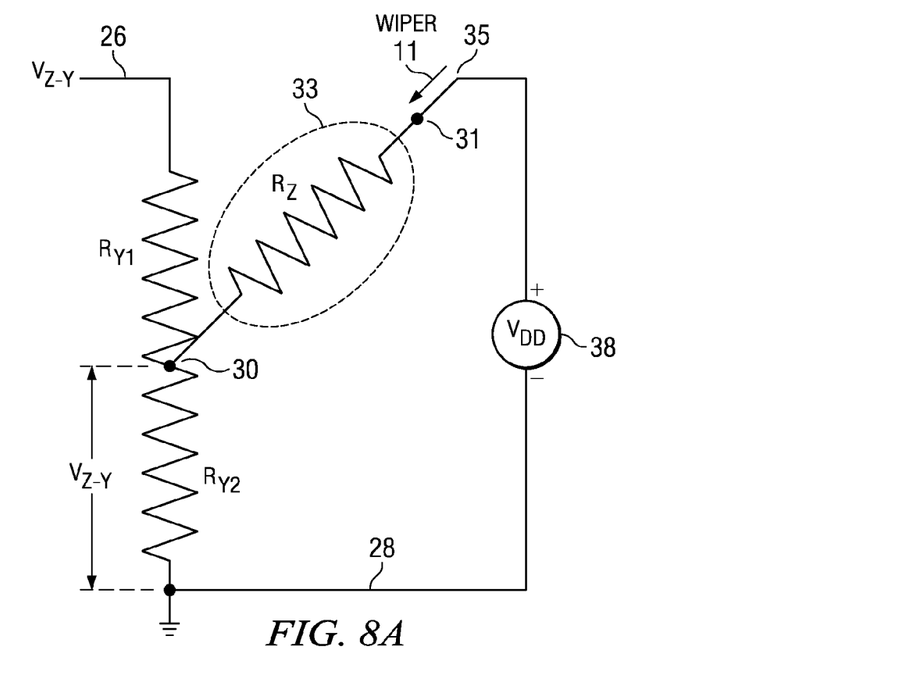
FIG. 8A is a diagram of a more simplified equivalent circuit representation of the circuit shown in FIG. 7A.

The simplified equivalent circuit of FIG. 8A illustrates more clearly than FIG. 7A the coupling of conductor 26 through resistance $R_{Y1}$ to touch pressure contact area 30. Touch pressure contact area 30 is coupled by the resistance $R_{Y2}$ to conductor 28. The resistance $R_Z$ between contact areas 30 and 31 (which is surrounded by dashed line 33 in FIGS. 7A and 7B) is the contact resistance between resistive layer 16 and wiper layer 11. To measure the touch pressure contact resistance $R_Z$ of 5-wire resistive touch screen 10 (see FIGS. 1 and 2), $V_{DD}$ is applied between contact terminal 35 of wiper 11 and conductor 28 (see FIGS. 7A and 8A). The touch pressure voltage $V_{Z-y}$ at the location of touch pressure contact area 30 against resistive layer 16 is the voltage across resistance $R_{Y2}$. The voltage on conductor 26 is equal to $V_{Z-Y}$ because the current through resistance $R_{Y1}$ is zero, because conductor 26 is electrically "floating".

Consequently, touch resistance $R_Z$ can be determined by measuring the value of touch pressure voltage $V_{Z-Y}$ measured between conductors 26 and 28. (Note that by definition, pressure is equal to force per unit area, and that the description of the invention herein is applicable irrespective of whether the intensity of the touch is expressed as a force or as a pressure.) Note that $V_{Z-Y}$ is the voltage produced by the voltage divider composed of the resistances $R_Z$ and $R_{Y2}$, and can be represented by Equation 3:

$$V_{Z-Y} = \left[\frac{R_{Y2}}{(R_Z + R_{Y2})}\right] \times V_{DD}. \qquad \text{Eq. 3}$$

To solve for the touch pressure contact $R_Z$, Equation 3 can be rewritten as Equation 4:

$$R_Z = \left[\frac{(V_{DD} - V_{Z-Y})}{V_{Z-Y}}\right] \times R_{Y2}. \qquad \text{Eq. 4}$$

Replacing $R_{Y2}$ in Equation 4 with Equation 2 results in Equation 5A:

$$R_Z = \left(\frac{V_Y}{V_{DD}}\right) \times \left(\frac{V_{DD}}{V_{Z-Y}} - 1\right) \times R_Y. \qquad \text{Eq. 5A}$$

Thus, the present touch resistance $R_Z$ is a function of the previously known values of $V_{DD}$ and $R_Y$, and the presently measured values of $V_{Z-Y}$ and $V_Y$.

Figure 8B:
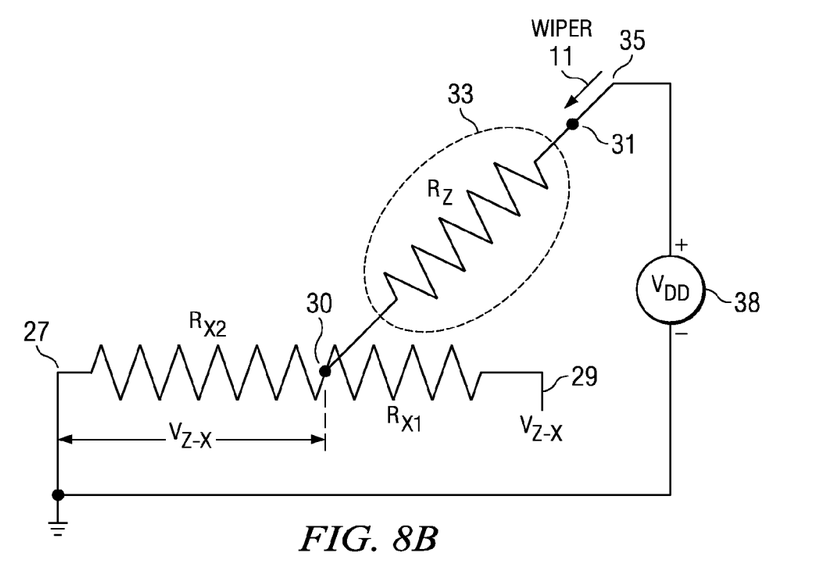
FIG. 8B is a diagram of a more simplified equivalent circuit representation of the circuit shown in FIG. 7B.

Similarly, to measure touch pressure contact resistance $R_Z$ of the 5-wire resistive touch screen 10 (see FIGS. 1 and 2), the voltage $V_{DD}$ is applied between the contact terminal 35 of wiper 11 and conductor 27 (see FIGS. 7B and 8B). The simplified equivalent circuit of FIG. 8B illustrates more clearly than FIG. 7B the coupling of conductor 29 through resistance $R_{X1}$ to touch pressure contact area 30. The touch pressure voltage $V_{Z-X}$ at the location of touch pressure contact area 30 against resistive layer 16 is the voltage across resistance $R_{X2}$. The voltage produced by the voltage divider composed of the resistances $R_Z$ and $R_{X2}$ and, with equations similar to Equation 4 and Equation 5, touch pressure contact resistance to $V_{Z-X}$ can also be expressed in Equation 5B:

$$R_Z = \left(\frac{V_X}{V_{DD}}\right) \times \left(\frac{V_{DD}}{V_{Z-X}} - 1\right) \times R_X. \qquad \text{Eq. 5B}$$

To measure $R_Z$, users can apply Equation 5A or 5B, or average the results from both of Equations 5A and 5B. To simplify further discussion, only Equation 5A will be used.

Figure 9:
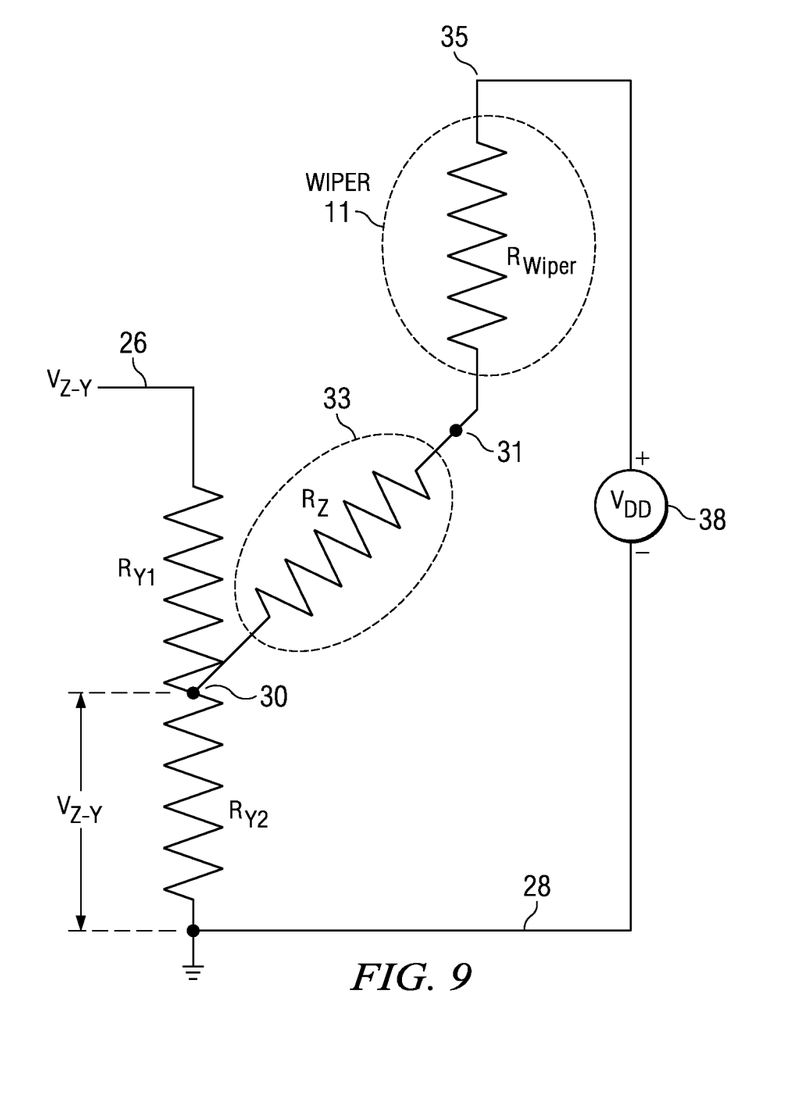

FIG. 9 is a simplified equivalent circuit that is the same as the one shown in FIG. 8A except that FIG. 9 further includes the resistance $R_{Wiper}$ of wiper 11, where $R_{Wiper}$ includes all resistances of wiper layer 11, including any other equivalent connection and/or wiring resistances that are coupled between touch pressure contact area 31 and the (+) terminal of voltage source 38. In many cases, the resistance $R_{Wiper}$ between $R_Z$ and the (+) terminal of voltage source 38 can be quite significant, due to the resistance of the resistive ITO layer of which wiper layer 11 is composed (see FIG. 4) and any connection/wiring resistances between the contact terminal 35 of wiper 11 and the (+) terminal of voltage source 38. When the total resistance $R_{Wiper}$ associated with wiper 11 is considered, Equation 5A becomes Equation 6:

$$R_Z + R_{Wiper} = \left(\frac{V_Y}{V_{DD}}\right) \times \left(\frac{V_{DD}}{V_{Z-Y}} - 1\right) \times R_Y. \qquad \text{Eq. 6}$$

The touch resistance $R_Z$ between the top wiper layer 11 and bottom resistive layer 16 is a function of the touch intensity (e.g., touch pressure or touch force), and therefore can be used to compute the touch intensity $P_{touch}$. The touch intensity applied against any location on the surface of a 5-wire resistive touch screen is inversely proportional to the touch intensity contact resistance $R_Z$, so a heavier touch reduces $R_Z$ and a lighter touch increases $R_Z$ under the exact same conditions that determine the relationship between $R_Z$ and $P_{touch}$. As a general matter, the touch intensity $P_{touch}$ on touch screen 10 is a function of $R_Z$, and can be expressed in the polynomial form:

$$P_{touch} = a0 + a1 \times R_Z + a2 \times R_Z^2 + a3 \times R_Z^3 + \ldots, \quad \text{Eq. 7}$$

where the coefficients a0, a1, a2, a3, and so on are real values. The coefficients in Equation 7 are different for different touch screens. The resolution or accuracy of measuring the touch pressure contact resistance $R_Z$ resulting from touching a state-of-the-art touch screen is usually quite low, and there is usually no need to use more than about 4 or 5 terms of Equation 7 to be able to calculate an acceptably accurate value of touch intensity $P_{touch}$. The functional relationship between touch resistance $R_Z$ for any particular touch screen can be determined by a suitable calibration procedure. As a simplified example, Equation 7 may be approximated by the expression $$P_{touch} = \frac{1}{\alpha + \beta \times R_Z} \quad \text{Eq. 8}$$

where the coefficients $\alpha$ and $\beta$ are positive real values, are determined by the touch panel structure and materials, and can be easily obtained by the user by means of a calibration to determine the relationship between $P_{touch}$ and $R_Z$.

Because the total resistance $R_{Wiper}$ associated with wiper is a constant at any single touch point, the touch intensity can be derived from Equation 8 by substituting $R_Z$ from Equation 6 and expressed by Equation 9:

$$P_{touch} = \frac{1}{\alpha + \beta \times \left[\left(\frac{V_y}{V_{DD}}\right) \times \left(\frac{V_{DD}}{V_{Z-Y}} - 1\right) \times R_Y - R_{Wiper}\right]} \quad \text{Eq. 9}$$
$$= \frac{1}{\alpha - \beta \times R_{Wiper} + \beta \times R_Y \times \frac{V_Y}{V_{DD}} \times \left(\frac{V_{DD}}{V_{Z-Y}} - 1\right)}$$
$$= \frac{1}{\alpha' + \beta \times R_Y \times \frac{V_Y}{V_{DD}} \times \left(\frac{V_{DD}}{V_{Z-Y}} - 1\right)} = \frac{1}{\alpha' + \beta \times R_Z},$$

where $\alpha' = \alpha - \beta \times R_{Wiper}$ is a constant at any fixed point on a 5-wire resistive touch screen. Utilizing this methodology provided by the circuit in FIG. 9, the touch resistance at any location on a 5-wire resistive touch screen can be measured in terms of $R_Z$. $R_Z$ can be obtained from Equation 5A and/or 5B, or Equation 6 when considering the screen resistance of wiper layer 11.

Comparing Equation 9 (where $R_{Wiper}$ is considered, as shown in FIG. 9) with Equation 8 (where $R_{Wiper}$ is not considered, as in FIGS. 8A and 8B), the expression of the relationship between $R_Z$ and $P_{touch}$ is the same at every touch area on a 5-wire restive touch screen.

Figure 10:
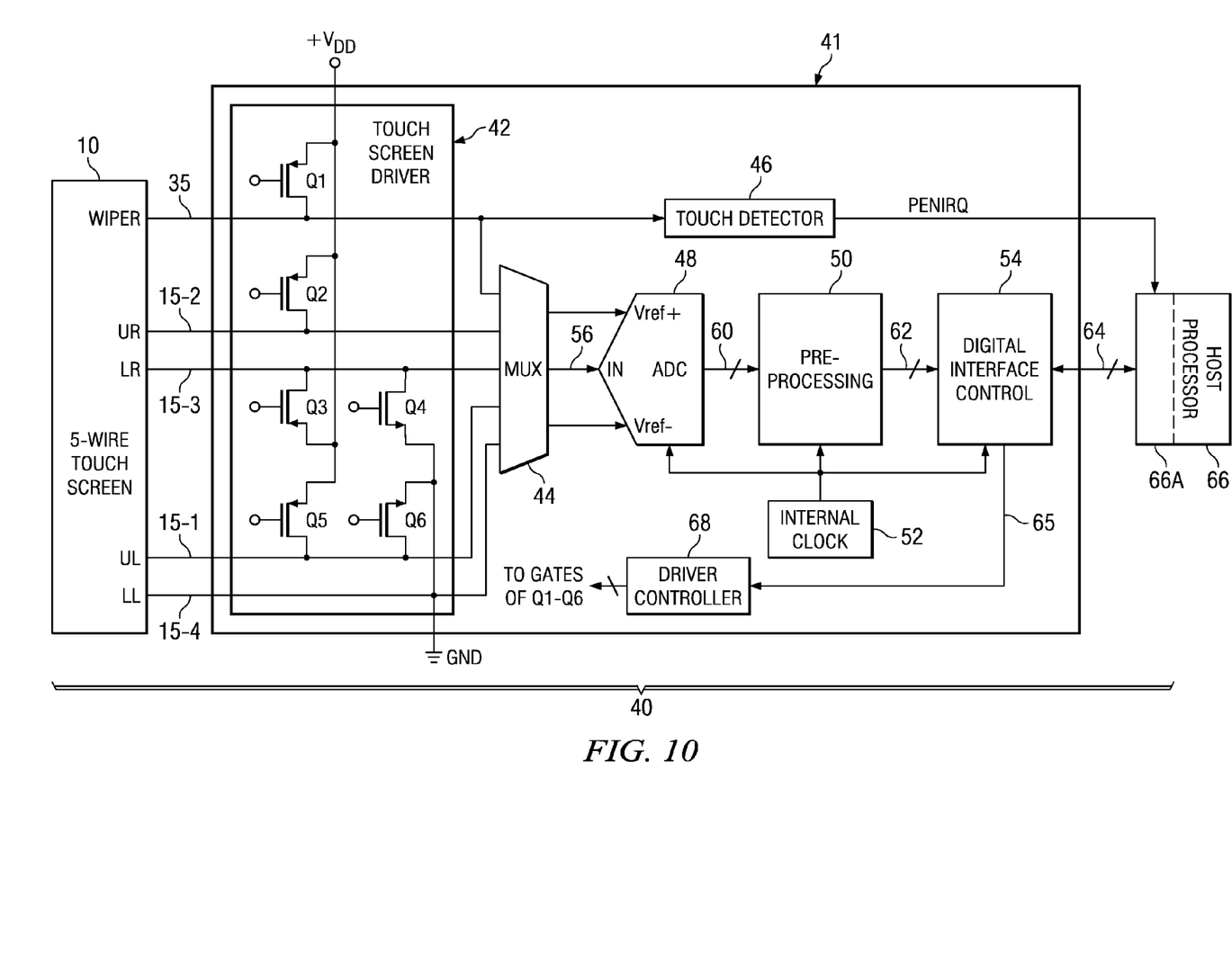
FIG. 10 is a block diagram of a touch screen system in which the touch pressure contact area resistance measuring method and touch pressure measuring method of the present invention are implemented.

FIG. 10 shows a touch screen system 40 which includes touch screen 10 coupled to a touch screen controller 41 that can interface with a host processor 66. Touch screen system 40 provides digital representations of measured values of the $V_X$, $V_Y$, and $V_Z$ (i.e., $V_{Z-Y}$ or $V_{Z-X}$) voltages expressed in the foregoing equations. Or alternatively and often preferably, touch screen system 40 can provide digital x, y, and z "coordinate values" representative of the measured values of the $V_X$, $V_Y$, and $V_Z$ voltages, which completely indicate a three-dimensional touch location on touch screen 10.

There are 5 analog signals coupled between touch screen controller 41 and touch screen 10. Touch screen controller 41 is connected to contact terminal 35 of wiper 11 of touch screen 10. Touch screen controller 41 also is connected to terminals UL, UR, LR, and LL of touch screen 10. Terminals UL, UR, LR, and LL and contact terminal 35 of wiper 11 are connected to touch screen driver circuitry 42 inside touch screen controller 41, and are further connected to the inputs of a multiplexer 44 of touch screen controller 41. Multiplexer 44 determines which of these conductors are multiplexed to the input 56 of an ADC (analog to digital converter) 48 which converts $V_X$, $V_Y$, and $V_Z$ to digital touch data. After preprocessing circuit 50 (which, for example, can perform noise filtering), digital touch data is sent to host processor 66 through a conventional digital interface control circuit 54 and a digital bus 64.

Wiper 11 is connected by contact terminal 35 to the drain of a P-channel switching transistor Q1 having its source connected to $V_{DD}$. $V_{DD}$ also is connected to the sources of P-channel switching transistors Q2, Q3, and Q5. The drains of transistors Q2, Q3 and Q5 are connected to UR terminal 15-2, LR terminal 15-3, and UL terminal 15-1, respectively. The sources of N-channel switching transistors Q4 and Q6 are connected to ground. The drain of transistor Q4 is connected to LR terminal 15-3, and the drain of transistor Q6 is connected to UL terminal 15-1. The gates of transistors Q1, 2 . . . 6 are connected to a driver controller circuit 68 of touch screen driver 42, which can be controlled according to either simple logic circuitry or according to appropriate control signals or commands from host processor 66.

Touch screen system 40 can be considered to include touch screen 10, touch screen controller 41, and a portion of host processor 66. A portion 66A of host processor 66 which can be considered to be part of touch screen system 40 is the portion that communicates with touch screen controller 41 through digital interface control circuit 54 and touch detector 46. Portion 66A can be considered to include software that performs the above described calculations associated with touch screen controller 41 and software that is associated with operation of touch screen driver 42. Portion 66A of host processor 66 also can be considered to include software and hardware that is associated with storing data associated with touch screen 10 and communicating the data to application software elsewhere in host processor 66.

The switch transistors in driver controller 68 can be easily controlled by various circuitry, such as a simple state machine, that implements subsequently described Table 1. Driver controller 68 can receive a command from host processor 66 via conductor or bus 65 and digital interface control circuit 54.

Multiplexer 44 multiplexes the 5 signals on conductors 35, 15-1, 15-2, 15-3 and 15-4 from touch screen 10 to generate reference voltages $V_{REF}^+$ and $V_{REF}^-$ and also generate an analog input signal on input conductor 56 of ADC 48. (PENIRQ is an interrupt output from a touch detector circuit 46 having an input connected to wiper contact terminal 35, and indicates if a touch on touch screen 10 has been detected.)

Table 1 shows the states of the various transistors (or switches) Q1-6 and the connections of the various terminals of resistive layer 16 and wiper 11 (i.e., the analog inputs to multiplexer 44) and the voltage reference signals and the analog signal to ADC 48 that are output from multiplexer 44 during operation of touch screen controller 40 to measure $V_X$, $V_Y$, and $V_Z$.

TABLE 1

|  | Measuring $V_X$ | | Measuring $V_Y$ | | Measuring $V_Z$ | |
| --- | --- | --- | --- | --- | --- | --- |
|  | ON | OFF | ON | OFF | ON | OFF |
| Input to Multiplexer 44 | | | | | | |
| Wiper: --> |  | Q1 |  | Q1 | Q1 |  |
| UR: --> | Q2 |  | Q2 |  |  | Q2 |
| LR: --> | Q3 | Q4 | Q4 | Q3 | Q4 | Q3 |
| UL: --> | Q6 | Q5 | Q5 | Q6 |  | Q5, Q6 |
| LL: --> | always connected to GND | | | | | |
| Output from Multiplexer 44 | | | | | | |
| ADC input 56: --> | Wiper contact 35 | | wiper contact 35 | | UL/UR | |
| $V_{REF}^+$: --> | UR/LR | | UL/UR | | Wiper contact 35 | |
| $V_{REF}^-$: --> | UL/LL | | LR/LL | | LR/LL | |

ADC (analog to digital converter) 48 converts the measured analog voltages $V_X$, $V_Y$, and $V_Z$ on conductor 56 to a digital value on digital bus 60 in accordance with the various conditions indicated in Table 1.

As previously indicated, wiper contact 35 is selectively coupled to $V_{DD}$ through Q1, and UR is selectively coupled to $V_{DD}$ through Q2. LR is selectively coupled to $V_{DD}$ through Q3 and to ground through Q4. UL is selectively coupled to $V_{DD}$ through Q5 and to ground through Q6.

Referring to Table 1, to measure $V_X$, Q1 is off, so wiper contact 35 is coupled through multiplexer 44 to ADC input 56. Q2 is on, so UR is coupled to $V_{DD}$. Q3 is on, so LR is coupled to $V_{DD}$. Q3 and Q4 cannot both be on at the same time, and Q3 is on, so Q4 is off. Q5 is off and Q6 is on, which means UL and LL both are coupled to ground while UR and LR both are coupled to $V_{DD}$. Q2 and Q3 both are on UR and LR both are at $V_{DD}$. Wiper contact 35 is electrically floating because Q1 is off. UL is at ground because Q6 is on, and LL is always at ground. The $V_{REF}^+$ reference voltage input of ADC 48 is connected to UL and LR, which results in a voltage nearly equal to $V_{DD}$ being coupled to the $V_{REF}^+$ input of ADC 48. The $V_{REF}^-$ reference voltage input of ADC 48 is connected to UL and LL, which results in a voltage nearly equal to ground being connected to the $V_{REF}^-$ reference voltage input of ADC 48. See FIG. 6B.

To measure $V_Y$, Q1 is off, so wiper contact 35 is coupled through multiplexer 44 to ADC input 56. Q2 is on, so UR is coupled to $V_{DD}$. Q4 is on, so LR is coupled to GND. Q3 and Q4 cannot both be on at the same time, and Q4 is on, so Q3 is off. Q5 is on and Q6 is off, which means LR and LL both are coupled to ground while UR and UL both are coupled to $V_{DD}$. Since Q2 and Q4 are on, UR and UL both are at $V_{DD}$. Wiper contact 35 is electrically floating because Q1 is off. LR is at ground because Q5 is on, and LL is always at ground. The $V_{REF}$ reference voltage input of ADC 48 is connected to UL and UR, which results in a voltage nearly equal to $V_{DD}$ being coupled to the $V_{REF}$ input of ADC 48. The $V_{REF}$ reference voltage input of ADC 48 is connected to the LR and LL, which results in a voltage nearly equal to ground being connected to the $V_{REF}$ reference voltage input of ADC 48. See FIG. 6A.

To measure $V_Z$, Q1 is on so wiper contact 35 is connected to $V_{DD}$. Q2 is off so UR is electrically floating. Q3 is off and Q4 is on, so LR is at ground. Q5 and Q6 both are off so UL is electrically floating. LL is at ground. The input of the analog to digital conversion circuitry is connected to UL and UR. The $V_{REF}$ reference voltage input of ADC 48 is connected to wiper contact 35. The $V_{REF}$ reference voltage input of ADC 48 is connected to LR and LL. See FIGS. 7A and 8A.

The digital output generated on digital bus 60 by ADC 48 is provided as an input to a pre-processing circuit 50, which can function as a digital averaging filter to reduce noise before sending the measured quantity to host processor 66. Pre-processing circuit 50 also can perform various other functions, such as data validation. The output of pre-processing circuit 50 is coupled by digital bus 62 to a digital interface control circuit 54, which is coupled by means of bidirectional digital bus 64 to host processor 66.

Touch screen 10 and touch driver 42 produce values of analog voltages $V_X$, $V_Y$, and $V_Z$ to the input 56 of ADC 48. $V_X$, $V_Y$, and $V_Z$ represent three-dimensional touch position coordinates on touch screen 10, namely $V_X$, $V_Y$, and $V_Z$ as expressed by Equations 1 to 3, respectively. Typically, the digitized values of $V_X$, $V_Y$, and $V_Z$ produced by ADC 48 actually are digital x, y, and z coordinate location numbers, e.g. 2046, 4096 or the like corresponding to each of the analog values of $V_X$, $V_Y$, and $V_Z$ produced by multiplexer 44 on the input 56 of ADC 48. ADC 48 performs the conversions of the analog values of $V_X$, $V_Y$, and $V_Z$ to the digital x, y, and z coordinate location numbers and provides them to host processor 66 via preprocessing circuit 50 and digital interface control 54. Host processor 66 presents, applies, and/or interprets the data for specific user applications.

Thus, the digital representations of $V_X$, $V_Y$, and $V_Z$ (i.e., $V_{Z-Y}$ or $V_{Z-X}$) for the current touch on touch screen 10, for example, digital x, y, and z touch screen coordinate location number representations of the analog voltages $V_X$, $V_Y$, and $V_Z$, are provided by the controller 41 to host processor 66. If directly digitized representations of the measured analog voltages $V_X$, $V_Y$, and $V_Z$ are provided by driver 42, then host processor 66 then can use that information to locate the touch position corresponding to $V_X$ and $V_Y$, compute values of $R_Z$, and further compute the value of $P_{touch}$. Host processor 66 then can use those values for the present user application or purpose.

Host processor 66 might then use the value of $R_Z$ to eliminate system noise and/or improve the accuracy of the touch point information in other ways. For example, the z coordinate information may help determine whether what appears to be a very light pressure touch point is actually just due to vibration.

The relationship between touch point resistance $R_Z$ and touch pressure or intensity $P_{touch}$ may be complex, and various users may use host processor 66 to execute various algorithms to compute the touch pressure or intensity $P_{touch}$ on the basis of the digital representations of $V_X$, $V_Y$, and $V_Z$ generated by touch screen system 40 shown in FIG. 10. Host processor 66 can be used to establish/calibrate the relationship between $P_{touch}$ and $R_Z$ for any particular touch screen 10 and compute the touch pressure or intensity $P_{touch}$ being applied to wiper layer 11 on the basis of values of $V_X$, $V_Y$, and $V_Z$ generated by touch screen system 40.

It should be appreciated that the present invention is believed to provide the first 5-wire touch screen system that generates measurements from which a third dimensional coordinate value $R_Z$ can be obtained at any point on a 5-wire touch screen and touch point pressure can be computed, and thereby enables the host processor to perform more functions with more accuracy than previously has been possible using 5-wire touch screen systems. This can be very useful in some applications, such as graphic drawing, determining line or dot size, signature verification, in which the touch intensity applied to provide a valid signature can be very significant. With the intensity/z-coordinate technique of the present invention, the touch screen system can generate 3-dimensional coordinates and therefore supports "3-dimensional" or "real-world" applications. In general, information regarding how much touch intensity is applied to the touch screen can help improve the overall performance of the touch screen system.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, in addition to using the above mentioned state machine to implement driver controller 68, there are other ways of controlling touch screen driver 42. Driver controller 68 could be implemented by means of logic circuitry other than a state machine. Host processor 66 may initiate operation of driver controller 68 so as to cause operation of touch screen driver 42 in accordance with Table 1. Driver controller 68 itself could be programmable so as to cause touch screen driver 42 to automatically operate as desired to measure $V_X$, $V_Y$ and $V_Z$ if a touching on the touch screen surface is detected. Alternatively, the preprocessing circuitry 50 could be configured to control driver controller 68 in response to a valid touch on the surface of touch screen 10.

What is claimed is:

1. A 5-wire touch screen controller comprising:
    a wiper terminal;
    four resistive layer contact terminals;
    a reference voltage terminal;
    first, second, third, and fourth switches, each of the first, second, and third switches being coupled between the reference voltage terminal and a respective one of the four resistive layer contact terminals, the fourth switch being coupled between the reference voltage terminal and the wiper terminal;
    a multiplexer having first, second, third, fourth, and fifth input terminals, each of the first, second, third, and fourth input terminals being coupled to a respective one of the four resistive layer contact terminals, the fifth input terminal being coupled to the wiper terminal; and
    an analog to digital converter (ADC) having an input coupled to an output of the multiplexer.

2. The 5-wire touch screen controller of claim 1, wherein the reference voltage terminal is a first reference voltage terminal, the 5-wire touch screen controller further comprising:
    a second reference voltage terminal; and
    fifth and sixth switches, each of the fifth and sixth switches being coupled between the second reference voltage terminal and a respective one of the four resistive layer contact terminals.

3. The 5-wire touch screen controller of claim 2, further comprising:
    a driver controller coupled to respective control terminals of each of the first, second, third, fourth, fifth and sixth switches.

4. The 5-wire touch screen controller of claim 1, further comprising:
    a driver controller coupled to respective control terminals of each of the first, second, third, and fourth switches.

5. A 5-wire touch screen controller comprising:
    a wiper terminal;
    four resistive layer contact terminals;
    a reference voltage terminal; and
    first, second, third, and fourth switches, each of the first, second, and third switches being coupled between the reference voltage terminal and a respective one of the four resistive layer contact terminals, the fourth switch being coupled between the reference voltage terminal and the wiper terminal.

6. A 5-wire touch screen controller comprising:
    a wiper terminal;
    four resistive layer contact terminals;
    a multiplexer having first, second, third, fourth, and fifth input terminals, each of the first, second, third, and fourth input terminals being coupled to a respective one of the four resistive layer contact terminals, the fifth input terminal being coupled to the wiper terminal; and
    an analog to digital converter having an input coupled to an output of the multiplexer.

* * * * *